United States Patent [19]

Dettmer

[11] 4,200,967

[45] May 6, 1980

[54] METHOD AND APPARATUS FOR RECLAIMING POLYMER FROM SCRAP PLASTIC FILM ROLLS

[75] Inventor: Edward V. Dettmer, Linwood, Mich.

[73] Assignee: The Dow Chemical Company, Midland, Mich.

[21] Appl. No.: 957,117

[22] Filed: Nov. 2, 1978

[51] Int. Cl.² .............................................. B26D 7/08
[52] U.S. Cl. ...................................... 29/426.2; 29/426; 83/924
[58] Field of Search .......................... 29/403, 426, 427; 83/437, 924; 30/90.4, 90.8, 90.9

[56] References Cited

U.S. PATENT DOCUMENTS

| 1,640,090 | 8/1927 | Murray | 83/924 |
| 3,245,302 | 4/1966 | Bayley | 83/924 |
| 3,648,554 | 3/1972 | Arnold et al. | 83/924 |

Primary Examiner—Lowell A. Larson
Attorney, Agent, or Firm—R. B. Ingraham

[57] ABSTRACT

Scrap plastic film rolls are axially pushed onto a mandrel wherein at least one axial cut is made through the roll film, the film roll including the paper core is pushed toward a separator which strips the film from the core, the core is moved axially on the mandrel, slit and removed from the mandrel thereby separating plastic film and the core material.

10 Claims, 5 Drawing Figures

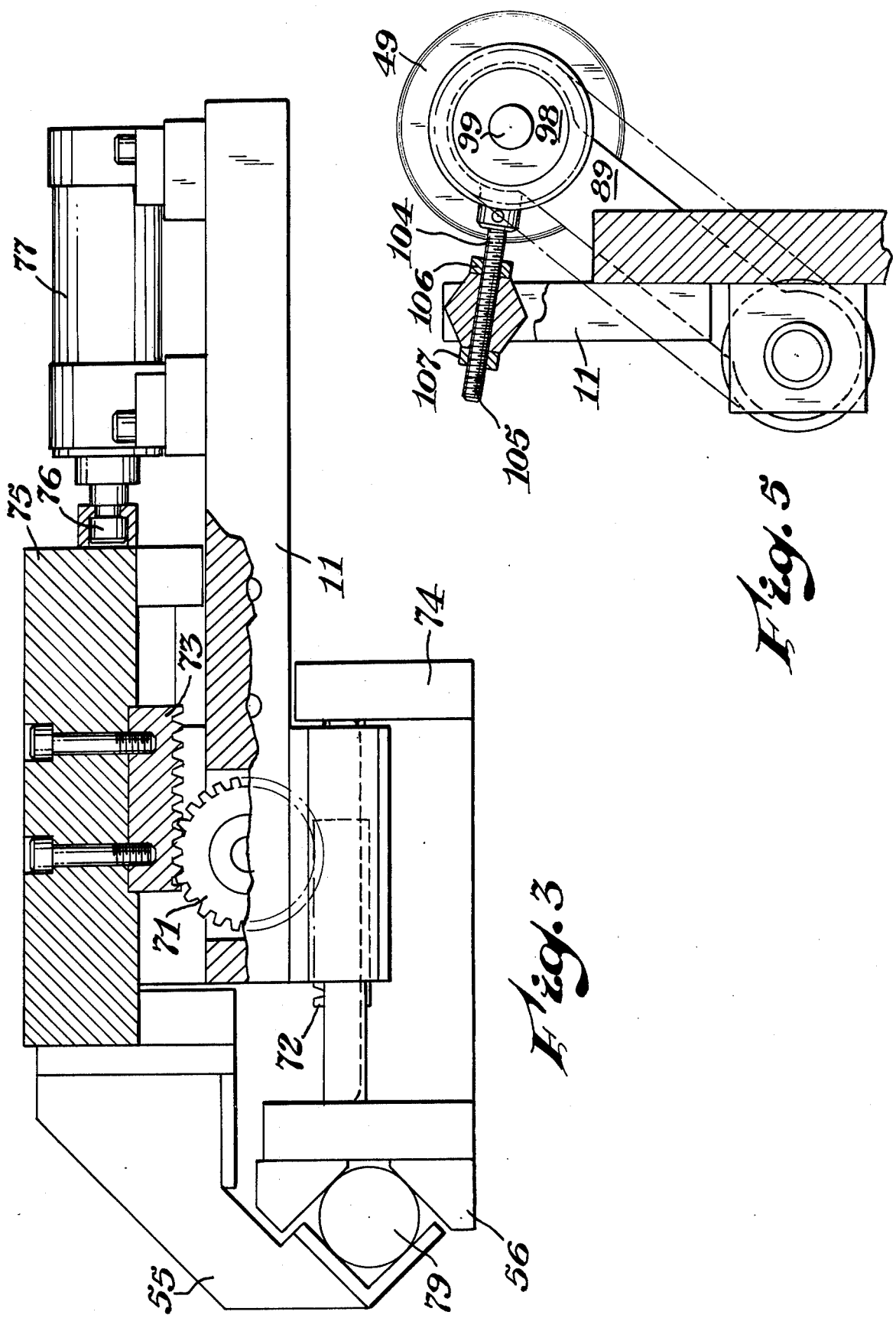

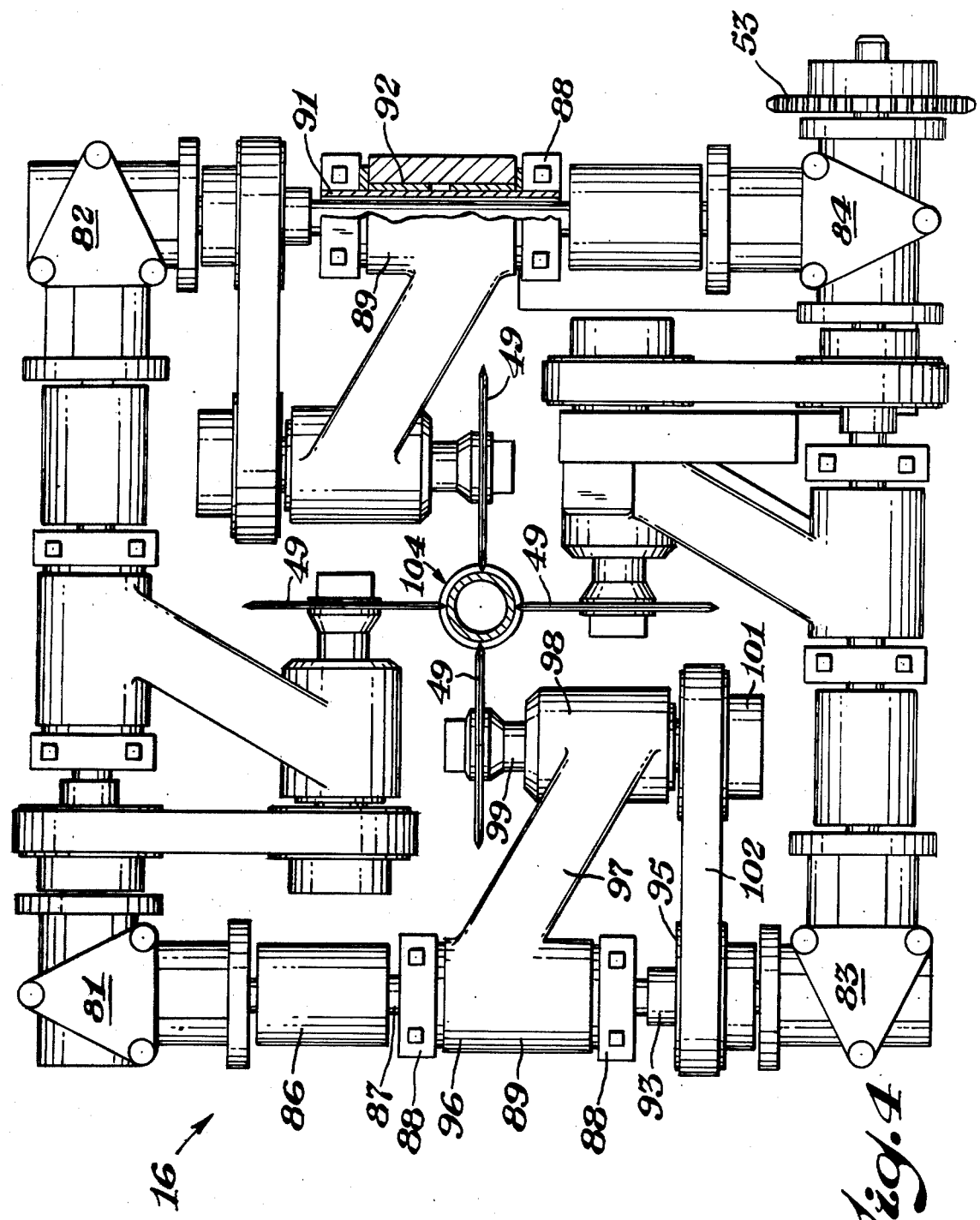

METHOD AND APPARATUS FOR RECLAIMING POLYMER FROM SCRAP PLASTIC FILM ROLLS

Much plastic film is produced and sold for varying purposes in the form of elongated strips wound on hollow cylindrical cores. A large portion of such film is used for household purposes such as food covering and the like. Usually in the manufacture of such film a wide film is prepared which is subsequently either slit into ribbons of the desired width and wound onto hollow cylindrical cores most often of paper, or film is wound onto a hollow cylindrical core which is subsequently cut into film rolls of the desired length. As with most manufacturing operations, a percentage of the product is not suitable for sale due to one or more deviations from a desired configuration, such as rolls in which the film has become wrinkled, too much or too little film has been wound on the core, the film has blocked, that is adhered to itself so that it is not readily unwound, the film that is on the roll has been mechanically damaged. If such defective scrap or unsuitable rolls of film are discarded, a substantial loss is realized in the amount of plastic or resin as well as a significant loss in the core upon which the film is wound.

It would be desirable if there were available an improved method and apparatus for the recovery of the film polymer.

It also would be desirable if there were available an improved apparatus which would separate plastic film from a core upon which it were wound.

These benefits and other advantages in accordance with the present invention are achieved in a method for the separation of plastic film from a core upon which plastic film is wound, the steps of the method comprising providing a roll of plastic film, the roll comprising a hollow generally cylindrical core having wound on the outer surface thereof a synthetic resinous film in a generally spiral configuration, forcing the core of the roll over a generally elongate cylindrical mandrel while simultaneously cutting through the film in a generally axial direction relative to the mandrel and core, forcing the core and the cut film through a stripping means of a size sufficient to pass the core but insufficient to pass the film, to thereby separate the film from the core subsequently slitting the core in an axial direction and removing the core from the mandrel.

Also contemplated within the scope of the present invention is an apparatus for the salvage of plastic from a roll of plastic film by the removal of the plastic film from a hollow cylindrical core, the apparatus comprising in cooperative combination: a frame having an axis of operation, the frame supporting a roll receiving means disposed adjacent a roll positioning means, the receiving means being adapated to deliver a roll of plastic film to the roll positioning means, the roll positioning means being adapated to position a roll on the axis of operation, a roll forwarding means disposed adjacent the roll positioning means, the roll forwarding means terminating in a slotted generally hollow cylindrical configuration, a mandrel affixed to the frame remote from the roll positioning means, the mandrel being of a generally cylindrical configuration, the mandrel positioned on the axis of operation and coaxial therewithin, the mandrel being of a generally constant diameter in the region adjacent the roll positioning means and tapering to a substantially larger diameter adjacent the region of connection to the frame, a film slitting means disposed adjacent a terminal portion of the mandrel remote from the point of attachment of the mandrel to the frame, the slitting means adapted to the slit film carried on the generally cylindrical core and thereby provide an axially extending slit in the film, the film slitting means being disposed generally adjacent the film positioning means, a film stripping means disposed generally adjacent the film slitting means and remote from the roll positioning means, the mandrel and the film stripping means defining a space therebetween, the space between the film stripping means and mandrel being sufficient to pass the core of the roll being operated upon but being insufficient to permit the passage of a significant amount of plastic film, the film stripping means being affixed to the frame, a core slitting means disposed adjacent the mandrel generally adjacent the region of increasing mandrel diameter, the core slitting means adapted to axially slit a core disposed on the mandrel.

Further features and advantages of the present invention will become more apparent from the following specification taken in connection with a drawing wherein FIG. 1 shows a side view of an apparatus in accordance with the invention.

FIG. 3 shows the operation of the roll centering means.

FIG. 4 shows a view of the film slitting means, and

FIG. 5 illustrates positioning the cutters of FIG. 4.

Figure 1:
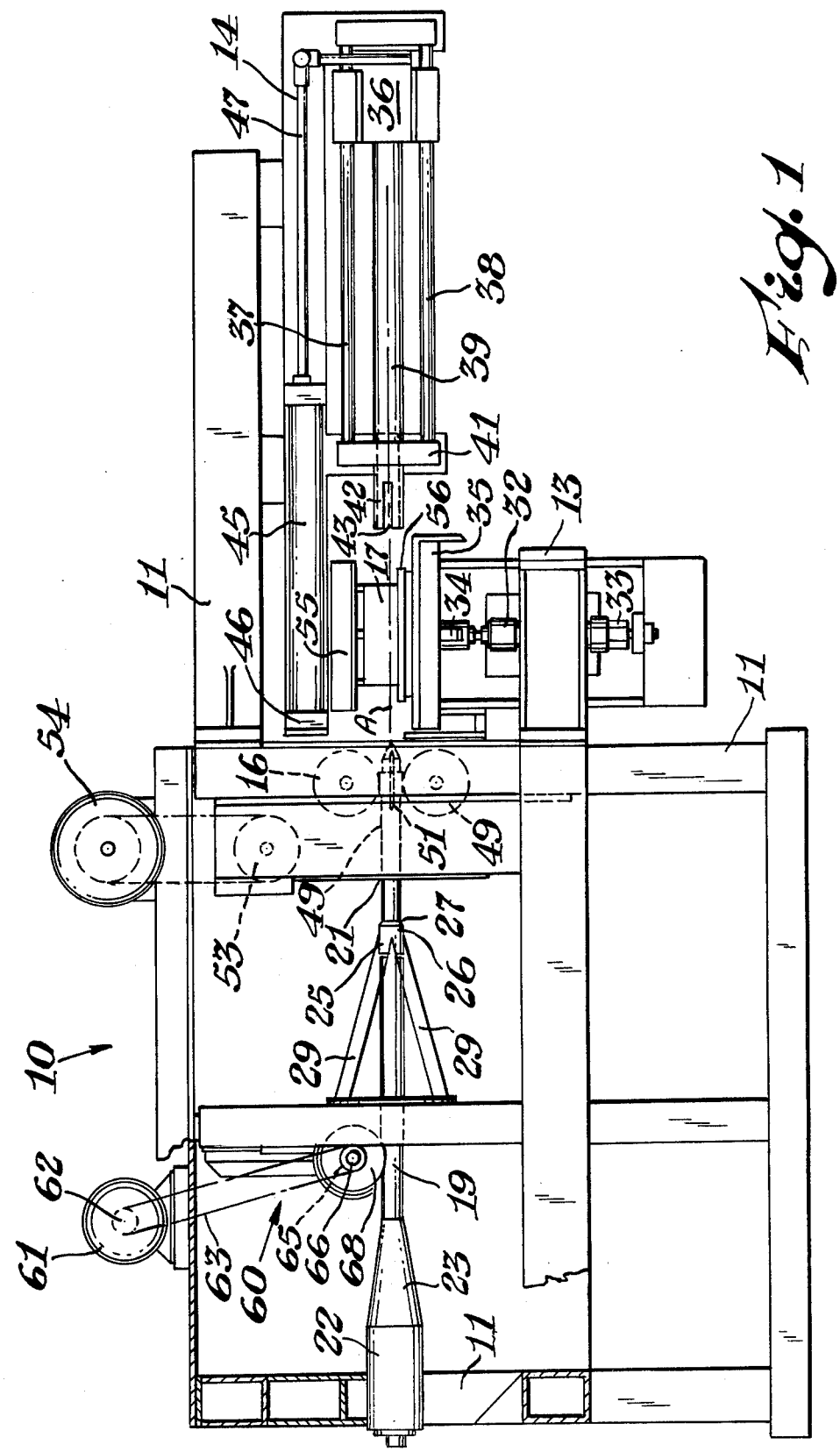

In FIG. 1 there is schematically represented a polymer salvaging apparatus in accordance with the present invention generally designated by the reference numeral 10. The apparatus 10 comprises in operative combination a frame 11, a roll positioning means 13, a roll forwarding means 14, a film slitting means 16; the roll forwarding means 14 being disposed generally adjacent the roll positioning means 13 and remotely disposed from the film slitting means 16. Between the forwarding means 14 and the slitting means 16 is a roll centering means 17. A mandrel 19 is disposed generally coaxially with the axis F adjacent to the first end 21. The stripping means 25 comprises a collar 26 supported in fixed space relationship to the mandrel 21, the collar 26 has a leading tapered edge 27, the edge 27 is frustoconical in configuration and outwardly flaring toward the second end 22 of mandrel 19. The collar 26 is supported and affixed to the frame 11 by means of four support members or legs 29. The roll positioning means 13 is supported at frame 11 and comprises a linear actuator 32 partially shown, the linear actuator may be electrical or pneumatic or hydraulic cylinder. The linear actuator 32 has a first end 33 and a second end 34. The first end 33 is affixed to the frame while the second end is affixed to a pivoted channel member 35. Extension of the linear actuator 32 causes the channel member 35 to rotate about 90° and transfer a roll of film contained therein to a location closer to the axis A. The roll forwarding means 14 comprises a carriage 36, the carriage 36 being slidable supported on ways 37 and 38. The ways 37 and 38 extend generally parallel to the axis A. A hollow ram 39 is affixed to the carriage 36 and is slidably mounted within a way retainer 41. The ram 39 is disposed generally on the axis A and has an operating terminal end 42 disposed remote from the carriage 36. The ram 39 is disposed between the carriage 36 and the mandrel 19. Four slots 43 are disposed within the hollow end 42 and the ram 39. A roll forwarding means linear actuator 45 such as a pneumatic or hydraulic cylinder, is disposed generally parallel to the ways 37 and 38, the actuator 45 being affixed to the frame at a first end 46 and the actuating arm 47 of the activator 45 is affixed to the carriage 36. The cutting means 16 comprises four cutting blades 49, two shown which are disposed over four corresponding slots 51 formed in end 21 of mandrel 19. End 21 of mandrel 19 has a portion of slightly enlarged diameter in the region of slots 51. The cutters 49 are driven through a gear train not shown activated by pulley 53 which in turn is driven by motor 54 affixed to the frame. The roll centering assembly 17 has an upper jaw 55 and a lower jaw 56 and is positioned by means not shown. A core slitting assembly generally designated by the reference numeral 60 is affixed to frame 11 at a location generally adjacent the second end 22 of the mandrel 19. The core slitting assembly 60 comprises a motor 61 affixed frame 11 and a motor which has a pulley 62 which engages belt 63; the belt 63 engages a pulley 65 disposed on a mandrel 66, the mandrel 66 in turn carries a core slitting blade 68. The blade 68 extends into an axial groove in the mandrel, the axial groove not shown. Beneficially conventional circular saws, plywood or veneer bladed, provide satisfactory service as blade 68 when paper cores are used to support plastic film.

Figure 2:
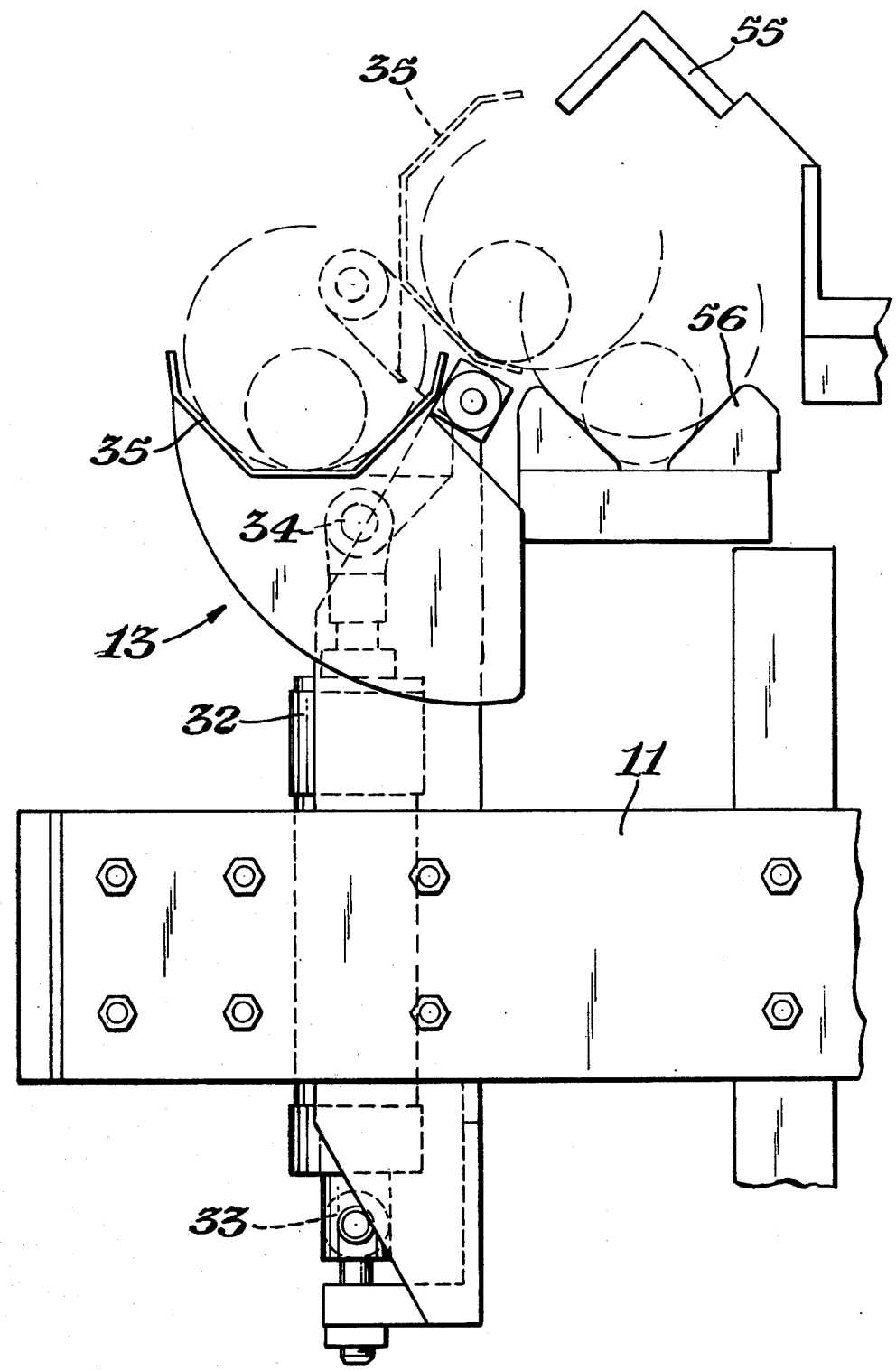
FIG. 2 shows a view of the roll positioning and roll centering means.

In FIG. 2 there is depicted a view of the roll positioning mechanism generally designated by the reference numeral 13 where the alternate positions of the trough 35 and the jaws 55 and 56 of the roll centering means are shown.

In FIG. 3 there is depicted the centering means 17 having jaws 55 and 56, the view in FIG. 3 is along the axis A of FIG. 1. FIG. 3 is partially in section. A spur gear 71 is rotatably mounted on the frame 11. The axis of the spur gear is generally parallel to axis A. The spur gear 71 engages a first rack 72 and a second rack 73. The racks 72 and 73 in turn are affixed to carriages 74 and 75 respectively. The carriages 74 and 75 are slidably supported on the frame by ways not shown. Carriage 74 is affixed to jaw 56 and carriage 75 to jaw 55. Carriage 75 is attached to the operating end 76 of linear actuator 77, the linear actuator being affixed to the frame 11. As depicted in FIG. 3, the centering means is shown in closed position wherein a roll such as the roll 79 is held generally coaxially with the operating axis A of FIG. 1.

In FIG. 4, there is depicted a partially cutaway view of a film cutting means 16 as employed in the apparatus 10 of FIG. 1. The cutting assembly 16 comprises four right-angle drive gear boxes 81, 82, 83 and 84. The gear boxes 81, 82, 83 and 84 are generally positioned at the corners of a square with the axis of their shafts generally paralleling the sides of such a square. Each adjacent pair of gear boxes 81-82, 81-83, 83-84, 82-84 has therebetween a shaft coupling 86 affixed directly to an output shaft of the box such as box 81, a stub shaft 87 is affixed to the coupling 86, a bearing block 88 affixed to the frame 11 through which shaft 87 passes, a spindle carrier 89 is pivotally supported by a pair of bearing support blocks 88, the support blocks 88 carry a tubular member 91 through which the shaft 87 passes and the tubular member 91 pivotally supports the spindle housing 89 on a sleeve bearing 92. The stub shaft 87 remote from coupling 86 defines an enlarged portion 93 which acts as coupling with the adjacent projecting shaft of the gear box. A pulley 95 is disposed over the enlarged portion 93 of the stub shaft 87 and affixed thereto. The spindle carrier has a base portion 96 pivotally supported by the bearing 92, a projecting arm 97 and a spindle head 98 which rotatably carries spindle 99. Spindle 99 has supported thereon a discoidal cutter 49 which is coaxially mounted on the spindle 99; remote from the cutter 49 is a pulley 101 which is in turn driven through belt 102 from pulley 95. A roll of film 104 is shown between the four cutters or blades 49. The blades 49 may be commercially available rotary slitting blades or prepared by grinding the teeth from a slitting saw to provide a knife edge disc with an included angle of about 15 degrees.

In FIG. 5 there are shown the manner of positioning the cutters 49, and rigid rod 104 pivotally affixed to the spindle head 98; the rod 104 passes through the frame 11, rod 104 has a threaded portion 105 which is engaged by threaded nuts 106 and 107 which permit adjustment of the position of cutter 49.

In operation of the apparatus of the present invention a roll of film is placed in the trough 35 of the film position 18. The linear actuator 32 is activated which positions the roll of film within the locator jaws 55 and 56 being disposed in their remote position. The linear actuator 77 is activated to close the jaws 55 and 56 on a roll such as the roll 77 of FIG. 3. The linear actuator of 45 is retracted causing the ram 39 to force the roll of film on to first end 21 of the mandrel 19. Desirably, the cutters such as the cutters 49 are rotated counter to the direction of roll feed, the ram forces the roll of film over the mandrel and past the cutters. The end 42 of ram 39 is provided with slots 43 and a cavity to receive sufficient of the mandrel to permit the entire roll to be positioned on the mandrel and clear of cutters 49. The procedure is then repeated adding a second roll to the mandrel and as a second roll is forced onto the mandrel, the core of the first roll is passed between the stripping collar 25 and the mandrel 19 while the roll of plastic film has effectively been quartered by the cutting means and drops into a suitable receptacle. As additional rolls of film are added to the mandrel, the cores reach the core slitting means or saw 68 which cuts the cores, and as the cores are passed on to the conical portion of mandrel 19, they drop away also to a suitable container.

Apparatus in accordance with the present invention is suitable for the separation of plastic film such as polystyrene, polyvinylchloride, polyethylene, polypropylene and other plastics from paper and cores of other materials.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

I claim:

1. A method for the separation of plastic film from a core upon which plastic film is wound, the steps of the method comprising
providing a roll of plastic film, the roll comprising a hollow generally cylindrical core having wound on the outer surface thereof a synthetic resinous film in a generally spiral configuration,
forcing the core of the roll over a generally elongate cylindrical mandrel while simultaneously cutting through the film in a generally axial direction relative to the mandrel and core, forcing the core and the cut film through a stripping means of a size sufficient to pass the core but insufficient to pass the film, to thereby separate the film from the core subsequently slitting the core in an axial direction and removing the core from the mandrel.

2. The method of claim 1 wherein the film on the roll is cut through in the plurality of locations, cutting being in the generally axial direction relative to the mandrel core.

3. The method of claim 1 wherein the core is a paper core.

4. The method of claim 1 wherein the cutting of the plastic film is done by rotating blades.

5. The method of claim 1 wherein the core is slit with a rotary saw.

6. An apparatus for the salvage of plastic from a roll of plastic film by the removal of the plastic film from a hollow cylindrical core, the apparatus comprising in cooperative combination:

a frame having an axis of operation, the frame supporting a roll receiving means disposed adjacent a roll positioning means, the receiving means being adapted to deliver a roll of plastic film to the roll positioning means, the roll positioning means being adapted to position a roll on the axis of operation, a roll forwarding means disposed adjacent the roll positioning means, the roll forwarding means terminating in a slotted generally hollow cylindrical configuration, a mandrel affixed to the frame remote from the roll positioning means, the mandrel being of a generally cylindrical configuration, the mandrel positioned on the axis of operation and coaxial therewithin, the mandrel being of a generally constant diameter in the region adjacent the roll positioning means and tapering to a substantially larger diameter adjacent the region of connection to the frame, a film slitting means disposed adjacent a terminal portion of the mandrel remote from the point of attachment of the mandrel to the frame, the slitting means adapted to the slit film carried on the generally cylindrical core and thereby provide an axially extending slit in the film, the film slitting means being disposed generally adjacent the film positioning means, a film stripping means disposed generally adjacent the film slitting means and remote from the roll positioning means, the mandrel and the film stripping means defining a space therebetween, the space between the film stripping means and mandrel being sufficient to pass the core of the roll being operated upon but being insufficient to permit the passage of a significant amount of plastic film, the film stripping means being affixed to the frame, a core slitting means disposed adjacent the mandrel generally adjacent the region of increasing mandrel diameter, the core slitting means adapted to axially slit a core disposed on the mandrel.

7. The apparatus of claim 6 wherein the film slitting means is a rotating blade.

8. The apparatus of claim 7 wherein the film slitting means is a plurality of rotating blades disposed about the mandrel.

9. The apparatus of claim 6 wherein the roll forwarding means comprises a ram, the ram adapted to force a roll into and past the cutting means on to the mandrel.

10. The apparatus of claim 6 wherein the cutting means is adjustably positioned relative to the mandrel.

* * * * *

UNITED STATES PATENT AND TRADEMARK OFFICE
CERTIFICATE OF CORRECTION

PATENT NO. : 4,200,967
DATED : May 6, 1980
INVENTOR(S) : Edward V. Dettmer

It is certified that error appears in the above-identified patent and that said Letters Patent are hereby corrected as shown below:

Column 2, line 43, delete "F" and insert --of operation designated by the character A. The mandrel has a first or unsupported end 21 and a second end 22 affixed to the frame 11 at a location remote from the roll positioning means 13. The mandrel 19 is generally of constant diameter except for an outwardly flaring mandrel portion 23 in the region 22 affixed to the frame 11. A stripping means 25 is disposed about the mandrel 19 generally--.

Signed and Sealed this

Twenty-sixth Day of August 1980

[SEAL]

Attest:

SIDNEY A. DIAMOND

Attesting Officer

Commissioner of Patents and Trademarks